No. 861,107.

PATENTED JULY 23, 1907.

R. A. GOGGIN.
DITCH CLEANING SHOVEL.
APPLICATION FILED MAY 2, 1907.

Witnesses
Jesse C. Miller
H. G. Smith

Inventor
Roy A. Goggin.
By Chandler & Chandler
Attorneys

THE NORRIS PETERS CO., WASHINGTON, D. C.

UNITED STATES PATENT OFFICE.

ROY A. GOGGIN, OF ESTHERVILLE, IOWA.

DITCH-CLEANING SHOVEL.

No. 861,107.

Specification of Letters Patent.

Patented July 23, 1907.

Application filed May 2, 1907. Serial No. 371,477.

*To all whom it may concern:*

Be it known that I, ROY A. GOGGIN, a citizen of the United States, residing at Estherville, in the county of Emmet, State of Iowa, have invented certain new and useful Improvements in Ditch-Cleaning Shovels; and I do hereby declare the following to be a full, clear, and exact description of the invention, such as will enable others skilled in the art to which it appertains to make and use the same.
This invention relates to ditch cleaning shovels, and more particularly to that class which are used in cleaning ditches for drain tile preparatory to placing the tiles therein and the primary object of the invention is to provide a simple shovel of this class which is capable of being adjusted to any desired angle with respect to the handle thereof.

In carrying out my invention, I support the shovel proper from the handle by means of an angle-lever, and connecting one arm of this lever and a clip, which is adjustable upon the said handle, is a link, it being understood that by adjusting the clip the angle lever is thrown to the desired angle and also the shovel or blade.

Figure 1:
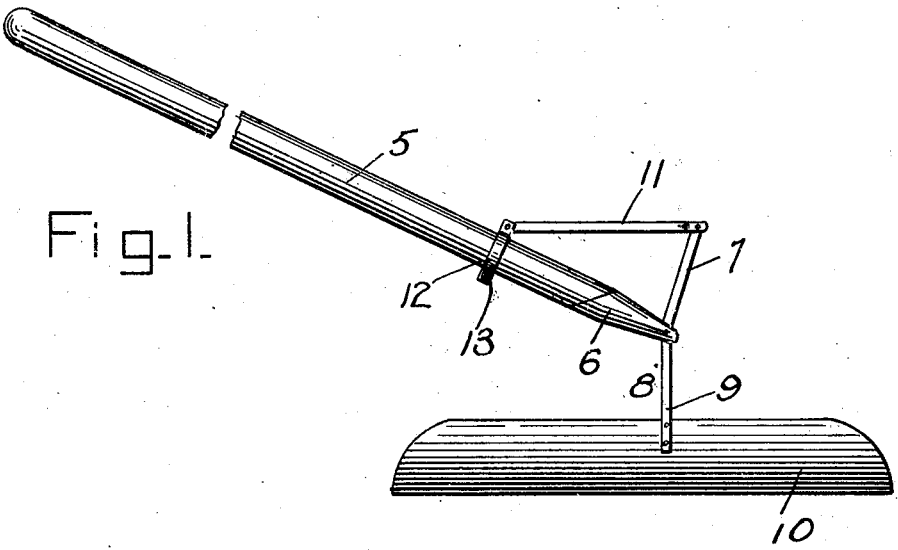
Figure 2:
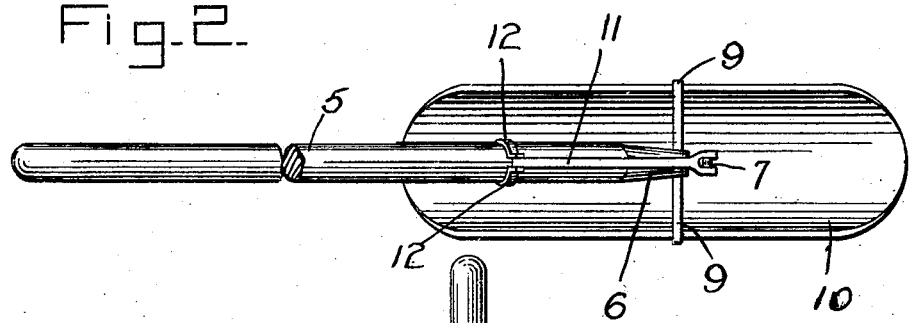
Figure 3:
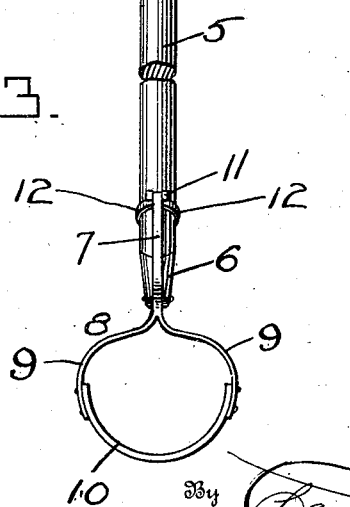

In the accompanying drawings—Figure 1 is a side elevation of a ditch cleaning shovel embodying my invention. Fig. 2 is a top plan view thereof, and, Fig. 3 is a front end view.

In the drawings, the handle for the shovel is indicated by the numeral 5, and 6 denotes a ferrule which is secured at one end of the handle and to which is pivoted an angle lever including arms 7 and 8. The angle lever is pivoted at the intersection of its arms, and the arm 7 extends above the handle whereas the arm 8 extends below the same, and is forked, as indicated by the numeral 9, the forks being secured at their lower ends to the sides of a semi-cylindrical shovel 10 adjacent the middle of the same.

Pivotally secured to the upper end of the arm 7 is the forward bifurcated end of a link or bar 11, and at its rear end this link is pivotally received between the ends of a pair of semicircular bands 12, which embrace the handle 5 and have their ends beneath the handle bolted, as at 13. Now from the foregoing it will be readily understood that the bolt 13 may be loosened and the clip formed by the bands 12 moved along the handle until the angle lever has been rocked to bring the shovel to the proper angle, after which the bolt may be tightened and the shovel held in this position.

It will be noted in connection with my invention that the supports for the shovel are not pivoted as is usually the case, but they are fixedly connected therewith and consequently a much more substantial shovel is secured.

What is claimed, is—

A shovel of the class described comprising a handle, an angle lever pivoted at one end of the handle at the point of intersection of its arms, one of the arms of the angle lever being extended above the handle and the other arm being extended below the same, the last-mentioned arm being forked, a semi-cylindrical shovel to the sides of which the lower ends of the forks of the said arm are secured, a clip adjustably engaged upon the handle, and a link connecting the clip and the first-mentioned arm of the angle lever.

In testimony whereof, I affix my signature, in presence of two witnesses.

ROY A. GOGGIN.

Witnesses:
   FRED H. RICHMAN,
   A. P. THORNE.